(12) United States Patent
Sumiya et al.

(10) Patent No.: US 8,105,518 B2
(45) Date of Patent: Jan. 31, 2012

(54) METHOD FOR JOINING FIRST AND SECOND MEMBERS TO EACH OTHER THROUGH A JOINT MATERIAL

(75) Inventors: Yoshiaki Sumiya, Kariya (JP); Hiroshi Koyama, Kariya (JP); Takahiro Yamazaki, Okazaki (JP); Kazuya Yoshijima, Okazaki (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 302 days.

(21) Appl. No.: 12/417,210

(22) Filed: Apr. 2, 2009

(65) Prior Publication Data

US 2009/0250883 A1 Oct. 8, 2009

(30) Foreign Application Priority Data

Apr. 3, 2008 (JP) ................. 2008-097194

(51) Int. Cl.
*B29C 45/14* (2006.01)
(52) U.S. Cl. ........ 264/163; 264/250; 264/255; 264/266; 264/275; 264/274; 264/263
(58) Field of Classification Search ........................ None
See application file for complete search history.

(56) References Cited

U.S. PATENT DOCUMENTS

| | | | | |
|---|---|---|---|---|
| 3,890,679 | A * | 6/1975 | Simon | 24/618 |
| 2006/0112916 | A1 | 6/2006 | Yoshijima et al. | |
| 2007/0120287 | A1 | 5/2007 | Suzuki et al. | |
| 2008/0266509 | A1 | 10/2008 | Nishi et al. | |

FOREIGN PATENT DOCUMENTS

| | | |
|---|---|---|
| JP | 2005-162998 | 6/2005 |
| JP | 2005-262870 | 9/2005 |
| JP | 2006-152969 | 6/2006 |
| JP | 2006-339403 | 12/2006 |
| JP | 2007-136868 | 6/2007 |
| JP | 2007-198601 | 8/2007 |
| JP | 2007-332763 | 12/2007 |
| JP | 2008-272984 | 11/2008 |
| JP | 2008-293000 | 12/2008 |

OTHER PUBLICATIONS

U.S. Appl. No. 12/404,572 to Sumiya et al., filed Mar. 16, 2009.
English Language Abstract of JP 2006-339403.

* cited by examiner

*Primary Examiner* — Edmund H. Lee
(74) *Attorney, Agent, or Firm* — Greenblum & Bernstein, P.L.C.

(57) ABSTRACT

A valve case, which is a metal component, and an outer shell portion of a cylinder head cover, which is a resin component, are joined together through a seal material. First, a recess formed in the valve case is filled with a seal material in a liquid form. A skin layer is then formed by curing the surface of the seal material. Subsequently, the outer shell portion is formed by supplying a synthetic resin material onto the valve case in such a manner as to cover the skin layer, which is provided on the surface of a non-cured portion of the seal material. At this stage, the skin layer is broken by supply pressure of the synthetic resin material and thus the synthetic resin material and the non-cured portion of the seal material are joined together as an integral body.

4 Claims, 3 Drawing Sheets

METHOD FOR JOINING FIRST AND SECOND MEMBERS TO EACH OTHER THROUGH A JOINT MATERIAL

BACKGROUND OF THE INVENTION

The present invention relates to a joint structure and a joining method by which a metal component and a resin component are joined together with seal material in between. For example, the present invention relates to a joint structure and a joining method by which a metallic oil control valve of an engine and a synthetic resin cylinder head cover that incorporates the oil control valve are joined together.

In a conventional art, such joint of a metal component and a resin component is carried out, for example, in the following manner. First, a recess formed in the metal component is filled with a seal material in a liquid form. Resin material is then supplied onto the metal component and the resin component and the metal component are molded as an integral body. Simultaneously, the seal material in the liquid form is cured. In this manner, the seal material seals the joint portion between the metal component and the resin component.

Japanese Laid-Open Patent Publication No. 2006-339403 discloses one such joint structure between a metal component and a resin component. The joint structure is employed in manufacturing a case that accommodates an electric component such as an electronic control circuit. Specifically, seal material in a liquid form is caused to fill a recess formed in the metal component and cured. Then, resin material in a molten state is provided on the metal component and thus the resin component and the metal component are molded as an integral body.

However, in the joint structure of the former conventional art, when the resin material is supplied onto the metal component with the recess filled with the seal material in the liquid form, pressure produced by the flow of the resin material may cause the seal material to flow out of the recess. As a result, desirable sealing performance may not be obtained in the joint portion between the metal component and the resin component.

To solve this problem, seal material in a liquid form having such a viscosity that the seal material does not flow out of the recess may be employed. However, the seal material in the liquid form with this level of viscosity lowers the work efficiency of filling the recess of the metal component with the seal material. Further, air may easily be caught between the seal material and the metal component in the recess. In this case, the air may lower the sealing performance.

In the joint structure of the aforementioned publication, the seal material may flow out of the recess, as in the case of the former conventional art, if the resin material in the molten state is supplied onto the metal material before the seal material is cured. However, after the seal material is sufficiently cured, the resin material flows between the seal material and the metal component when the resin material in the molten state is provided. Air is caught in corners of the recess at a position downstream in the flow direction of the resin material. This can lower the sealing performance.

SUMMARY OF THE INVENTION

Accordingly, it is an objective of the present invention to provide a joint structure that has a joint material arranged between two members, prevents leakage of a joint material, and enhances the sealing performance in a joint portion. It is another objective of the present invention to provide a joining method.

To achieve the foregoing objective and in accordance with a first aspect of the present invention, a joint structure by which a first member and a second member are joined together is provided. The first member has a recess formed in a surface. The joint structure includes a joint material in a liquid form filling the recess and a skin layer covering a surface of the joint material. The second member is pressed against the skin layer in such a manner that the skin layer is broken and thus the first member and the second member are joined together through curing of the joint material in the recess.

In accordance with a second aspect of the present invention, a method for joining a first member and a second member to each other through a joint material is provided. The method includes: filling a recess formed in the first member with a joint material in a liquid form; providing a skin layer on a surface of a non-cured portion of the joint material; and supplying a synthetic resin material in a molten state onto the first member in such a manner as to cover the skin layer so that the skin layer is broken by the pressure of the synthetic resin material, thereby joining the synthetic resin material and the non-cured portion of the joint material together as an integral body while molding the synthetic resin material as the second member.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A joint structure and a joining method according to a first embodiment of the present invention will now be described with reference to FIGS. 1 and 2. In the first embodiment, the invention is embodied as a synthetic resin engine cylinder head cover 11 that incorporates an oil control valve.

Figure 1:
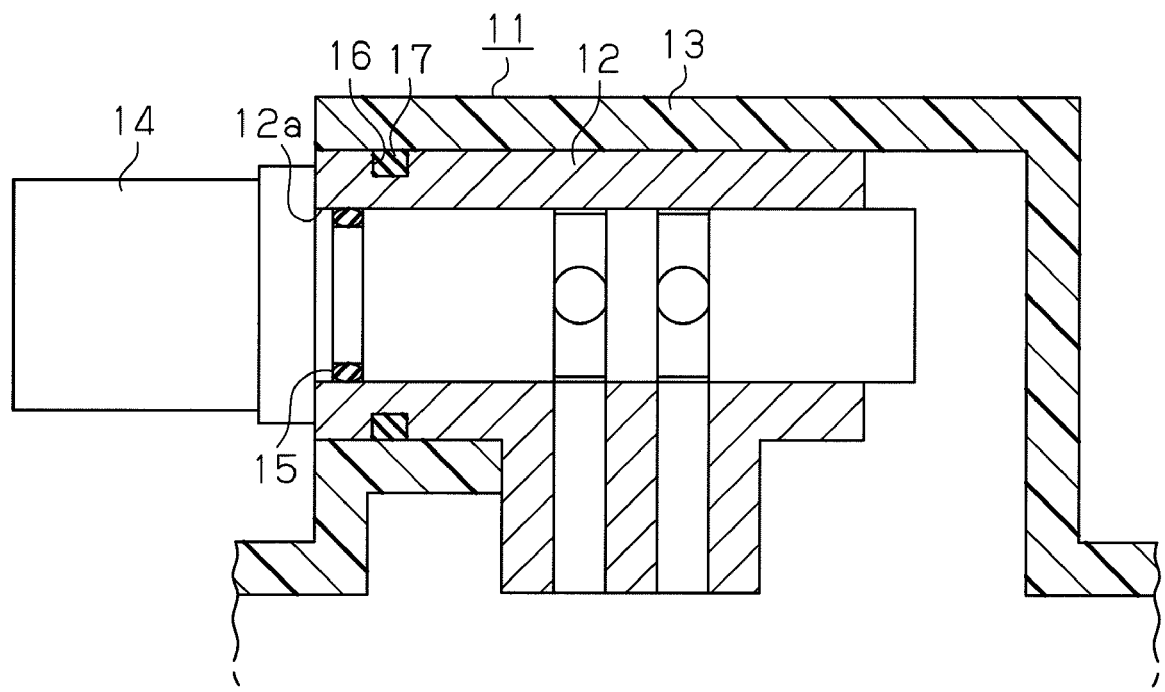
FIG. 1 is a cross-sectional view showing a portion of a cylinder head cover of a joint structure according to a first embodiment of the present invention.

As shown in FIG. 1, the cylinder head cover 11, which is a synthetic resin component, is formed of heat-resistant material such as polyamide resin (which is, for example, nylon 66). The cylinder head cover 11 has an outer shell portion 13, which a synthetic resin component formed integrally with the cylinder head cover 11. A valve case 12, which is a tubular metal component, is embedded in the outer shell portion 13. The outer shell portion 13 forms a portion of the cylinder head cover 11. While the valve case 12, or the metal component, forms a first member, the cylinder head cover 11 and the outer shell portion 13, which are the synthetic resin components, form a second member.

A valve body 14 of the oil control valve is mounted in the valve case 12. The valve body 14 is provided in the valve case 12 by inserting the valve body 14 from an opening 12*a* formed at an end of the valve case 12. In the vicinity of the opening 12*a* of the valve case 12, a synthetic resin seal ring 15, which is a joint material, is arranged between the inner circumferential surface of the valve case 12 and the outer circumferential surface of the valve body 14. As the material forming the seal ring 15, heat-resistant and elastic foamed resin such as silicone based resin is employed.

An annular channel extending along the entire circumference of the valve case 12, or a recess 16, is formed in the outer circumferential surface of the valve case 12. A seal material 17 is provided in the recess 16. The seal material 17 is formed of heat-resistant and elastic foamed resin such as silicone based resin. The outer shell portion 13 is formed on the outer circumferential surface of the valve case 12 in such a manner as to cover the seal material 17, while joined with the valve case 12. A joint portion between the valve case 12 and the outer shell portion 13 is sealed by the seal material 17. Since the thermal expansion coefficient of the metallic tubular valve case 12 and the thermal expansion coefficient of the synthetic resin outer shell portion 13 are different from each other, a gap may form between the valve case 12 and the outer shell portion 13. Even in this case, the seal material 17 prevents oil from leaking through the gap.

Next, a method for joining the outer shell portion 13, which is a resin component, with the valve case 12, which is a metal component, in the cylinder head cover 11, which is constructed as above, will be explained.

Figure 2A:
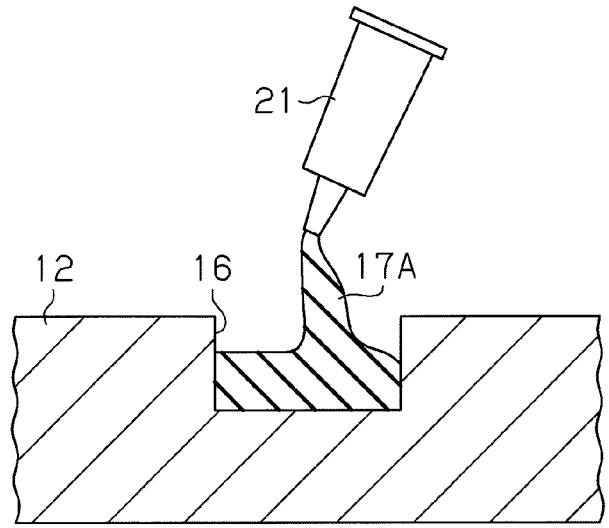
FIG. 2(a) is a cross-sectional view showing a portion of the joint structure in a step of pouring a seal material in a joining method according to the first embodiment.
Figure 2B:
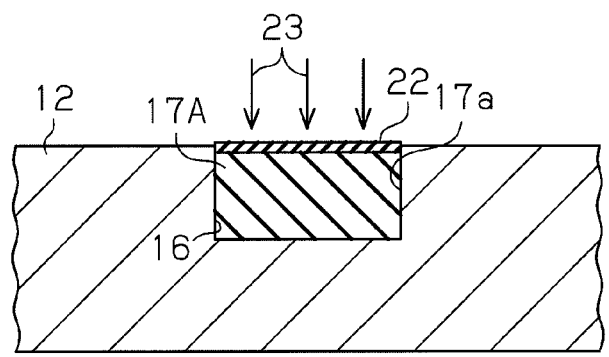
FIG. 2(b) is a cross-sectional showing a portion of the joint structure in a step of forming a skin layer after the pouring step of FIG. 2(a)
Figure 2C:
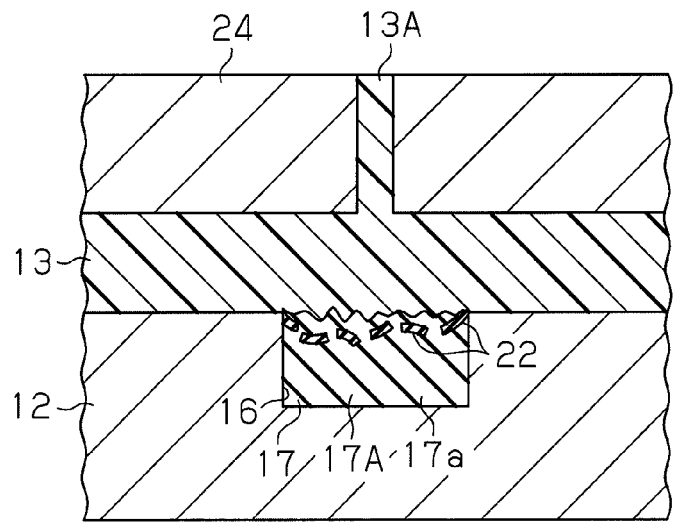
FIG. 2(c) is a cross-sectional view showing a portion of the joint structure in a joining step after the skin layer forming step.

First, to form the outer shell portion 13 on the valve case 12, in other words, to embed the valve case 12 in the outer shell portion 13, a step of pouring a liquid-form seal material 17A is carried out as illustrated in FIG. 2(*a*). In the pouring step, the recess 16 of the valve case 12 is filled with the liquid-form seal material 17A using a resin pouring device 21. As the liquid-form seal material 17A, it is preferable to use material that has affinity for the resin material of the outer shell portion 13, which allows the material to be easily bonded with the resin material, and exhibits elasticity when cured.

Then, with reference to FIG. 2(*b*), a step of providing a skin layer 22 is performed. Specifically, the skin layer 22 is formed by curing the surface of the liquid-form seal material 17A provided in the recess 16. It is preferred that the skin layer 22 be formed by blowing hot air 23 of an appropriate temperature onto the surface of the liquid-form seal material 17A. Further, if a moisture curing material, which initiates curing reaction with moisture, is used as the liquid-form seal material 17A, it is preferred that the skin layer 22 be formed by blowing highly humid air with such a humidity that droplets do not form on the surface of the liquid-form seal material 17A.

As has been described, the entire surface of a non-cured portion 17*a* of the liquid-form seal material 17A, which is provided in the recess 16, is covered by the skin layer 22 in a cured state. Accordingly, when the valve case 12 is transported for a subsequent step of manufacture, the non-cured portion 17*a* of the liquid-form seal material 17A is prevented from flowing out of the recess 16.

Subsequently, a molding step is carried out. After the valve case 12 is placed in an injection molding die 24, a synthetic resin material 13A is injected into the injection molding die 24 as illustrated in FIG. 2(*c*). This provides resin material in the die 24 in such a manner that the resin material covers the outer circumferential surface of the valve case 12 including the skin layer 22 formed on the surface of the liquid-form seal material 17A. At this stage, with reference to FIG. 2(*c*), the skin layer 22 is broken by injection pressure of the resin material 13A and thus the resin material 13A and the non-cured portion 17*a* of the liquid-form seal material 17A are provided as an integral body. The heat generated by the resin material 13A then cures the non-cured portion 17*a*, forming the seal material 17. The outer shell portion 13 is provided also by curing of the resin material 13A. As a result, the seal material 17 provides sealing performance between the valve case 12 and the outer shell portion 13. At this stage, the skin layer 22, which has been broken, does not disadvantageously influence the sealing performance since the amount of the skin layer 22 is small.

As has been explained, the first embodiment has the following advantages.

(1) The skin layer 22 is formed on the surface of the liquid-form seal material 17A after the liquid-form seal material 17A is provided in the recess 16 of the valve case 12, or the metal component. The skin layer 22 covers the surface of the non-cured portion 17*a* of the liquid-form seal material 17A. The surface of the non-cured portion 17*a* of the liquid-form seal material 17A is thus maintained in a state covered by the skin layer 22 until the outer shell portion 13, or the resin component, is formed by supplying the resin material 13A onto the valve case 12. This prevents the non-cured portion 17*a* of the liquid-form seal material 17A from flowing out of the recess 16 in the subsequent steps. The effect of preventing leakage of the liquid-form seal material 17A is particularly advantageous in, for example, the following situations: when the valve case 12 is transported for the injection molding step; when the valve case 12 is placed in the injection molding die 24; and when the resin material 13A is supplied onto the valve case 12. Further, the outer shell portion 13 is molded with the seal material 17 in a predetermined shape arranged between the outer shell portion 13 and the outer circumferential surface of the valve case 12, without trapping air in the seal material 17. This ensures desirable sealing performance in the joint portion between the valve case 12 and the outer shell portion 13.

(2) Since the liquid-form seal material 17A is prevented from flowing out of the recess 16, material with low viscosity may be employed as the liquid-form seal material 17A. This facilitates pouring of the liquid-form seal material 17A into the recess 16. Also, if the material with low viscosity is employed, the likelihood of trapping air in the liquid-form seal material 17A is further decreased.

(3) Since the skin layer 22 is formed on the surface of the liquid-form seal material 17A, foreign matter such as dust is prevented from collecting on the liquid-form seal material 17A.

Second Embodiment

A second embodiment of the present invention will hereafter be explained mainly on differences between the second embodiment and the first embodiment.

Figure 3:
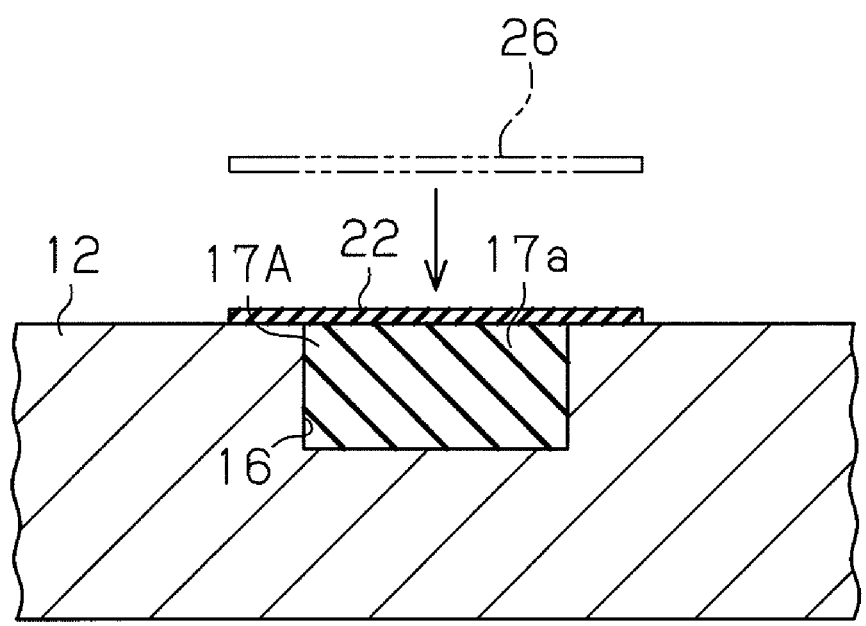
FIG. 3 is a cross-sectional view showing a portion of the joint structure in a joining method according to a second embodiment of the present invention.

The skin layer forming step of the second embodiment is different from that of the first embodiment. As illustrated in FIG. 3, a film 26 is applied onto the surface of the liquid-form seal material 17A after the liquid-form seal material 17A is caused to fill the recess 16 of the valve case 12, or the metal component. The film 26 is thus provided as the skin layer 22.

It is preferred that the film 26 be formed of material that has relatively high rigidity and easily breaks. It is further preferable that the material of the film 26 have affinity for the resin material of the seal material 17 and that of the outer shell portion 13, which allows the film 26 to be easily bonded with the resin material.

In the molding step, the resin material is injected into the die to form the outer shell portion 13. At this stage, injection pressure breaks the film 26 and thus the seal material 17A and the outer shell portion 13 are provided as an integral body.

Accordingly, the second embodiment has advantages equivalent to the above-described advantages of the first embodiment.

Modified Embodiments

The present invention may be embodied in the following modified forms.

The valve case 12, which is the first member, may be formed of resin instead of metal.

Although the present invention is embodied as the joint structure and the joining method for joining the valve case 12 and the outer shell portion 13 together, the invention may be employed for any other suitable use. The invention may be embodied as, for example, a joint structure and a joining method for joining an electric junction box (a second member) incorporating electric components such as fuses with a metal bush (a first member) extending through a wall of the electric junction box.

As opposed to the constructions of the first and second embodiments, a resin component may be molded on the inner circumferential surface of a cylindrical metal component. In this case, a recess is formed in the inner circumferential surface of the metal component and seal material is caused to fill the recess.

Although the present invention is embodied as the annular seal portion between the valve case 12 and the outer shell portion 13, the invention may be embodied as any other suitable seal portion such as a flat seal portion. In this case, the recess 16 is formed in a linear channel-like shape on one plane. Further, the recess 16 does not necessarily have to be a single recess but two or more recesses 16 may be formed.

Instead of the liquid-form seal material serving as the joint material in the liquid form, a liquid-form adhesive agent may be employed.

A sharp projection may be provided in the second member formed of metal or resin. In this case, joint material (which is, for example, adhesive or seal material) having a skin layer is provided on a surface of the first member. When the second member contacts the first member, the projection of the second member breaks the skin layer of the joint material of the first member. This joins the first member and the second member with each other through the joint material.

Therefore, the present examples and embodiments are to be considered as illustrative and not restrictive and the invention is not to be limited to the details given herein, but may be modified within the scope and equivalence of the appended claims.

What is claimed is:

1. A method for joining a first member and a second member to each other through a joint material, the method comprising:
    filling a recess formed in the first member with a joint material in a liquid form;
    providing a skin layer on a surface of a non-cured portion of the joint material; and
    supplying a synthetic resin material in a molten state onto the first member in such a manner as to cover the skin layer so that the skin layer is broken by the pressure of the synthetic resin material, wherein while molding the synthetic resin material as the second member, the first member is joined to the second member as the synthetic resin and the non-cured portion of the joint material are joined.

2. The method according to claim 1, wherein the molding the second member includes injection molding the synthetic resin material.

3. The method according to claim 1, wherein the providing the skin layer includes curing a surface of the joint material after the recess is filled with the joint material in a liquid form.

4. The method according to claim 1, wherein the providing the skin layer includes applying a film onto a surface of the joint material after the recess is filled with the joint material in a liquid form.

* * * * *